FREQUENCY SUPPLY CIRCUITS FOR CARRIER SYSTEMS

Filed Feb. 1, 1954 4 Sheets-Sheet 1

INVENTOR
W. F. MILLER
BY N. S. Ewing
ATTORNEY

FREQUENCY SUPPLY CIRCUITS FOR CARRIER SYSTEMS

Filed Feb. 1, 1954 4 Sheets-Sheet 2

INVENTOR
W. F. MILLER
BY
N. S. Ewing
ATTORNEY

FREQUENCY SUPPLY CIRCUITS FOR CARRIER SYSTEMS

Filed Feb. 1, 1954 4 Sheets-Sheet 3

INVENTOR
W. F. MILLER
BY
N. S. Ewing
ATTORNEY

Feb. 19, 1957 W. F. MILLER 2,782,314

FREQUENCY SUPPLY CIRCUITS FOR CARRIER SYSTEMS

Filed Feb. 1, 1954 4 Sheets-Sheet 4

INVENTOR
W. F. MILLER
BY N. A. Ewing
ATTORNEY

United States Patent Office 2,782,314

Patented Feb. 19, 1957

2,782,314

FREQUENCY SUPPLY CIRCUITS FOR CARRIER SYSTEMS

Walter F. Miller, Whippany, N. J., assignor to Bell Telephone Laboratories, Incorporated, New York, N. Y., a corporation of New York Application February 1, 1954, Serial No. 407,549

9 Claims. (Cl. 250—36)

This invention relates to two-way carrier communication systems and more particularly to the supply of pilot and carrier frequencies in such systems.

A repeatered multiplex carrier communication system commonly has, at each of its two terminals, one or more local oscillation sources to supply modulators and demodulators with the several carrier waves required for transmission and reception, and to supply also one or more pilot waves which are transmitted over the signal system and used to regulate the characteristics of the repeaters.

Among the objects of the invention are to reduce the number of local oscillation sources to one at each terminal, to enable the local oscillation source at either terminal to supply the carrier and pilot waves needed at both terminals, and to make it possible for the local oscillator source at the controlled terminal to come into service automatically on failure of the received pilot.

In accordance with an embodiment of the invention provision is made at each terminal for applying a base frequency $f_b$ to a harmonic generator from the output of which are taken the various frequencies needed for carriers and pilots. The base frequency is derived from a frequency subdivider that is energized alternatively by a local source of oscillations of frequency $f_o$ or by oscillations of the same frequency $f_o$ derived by intermodulation of the base frequency $f_b$ and pilot waves of a frequency $f_p$ received from the other terminal. Both of the local oscillation sources are employed to set the multifrequency generating system into operation, but one of them is effectively disconnected as soon as, and so long as, pilot waves $f_p$ are received from the other terminal. In the event the working oscillation source fails, thereby interrupting the transmission of the pilot waves to the other terminal, the oscillation source at that other terminal is thereby immediately reconnected and service continues as before, in one direction only.

Inasmuch as all pilot waves for both directions of transmission are derived directly or indirectly from the one oscillation source, the one or more pilot waves employed for regulation of repeaters in the one direction of transmission may be maintained at exactly the same frequency as those employed for the opposite direction of transmission. In the case of a four-wire transmission line system, therefore, the two circuits may be so poorly shielded from each other as to permit a substantial amount of induction or cross-talk at the pilot frequencies and yet no low beat frequency will develop to cause unwanted fluctuation of the repeater characteristics.

Referring to the figures of the drawings,

Fig. 1 shows a frequency supply for a two-way carrier communication system operating over spiral-four cable or the like whereby a number of carrier and other frequencies may be derived from a base frequency, in this case, 4 kilocycles. The supply circuits are alike at the terminals but only one is shown for ease of description.

Figure 1:
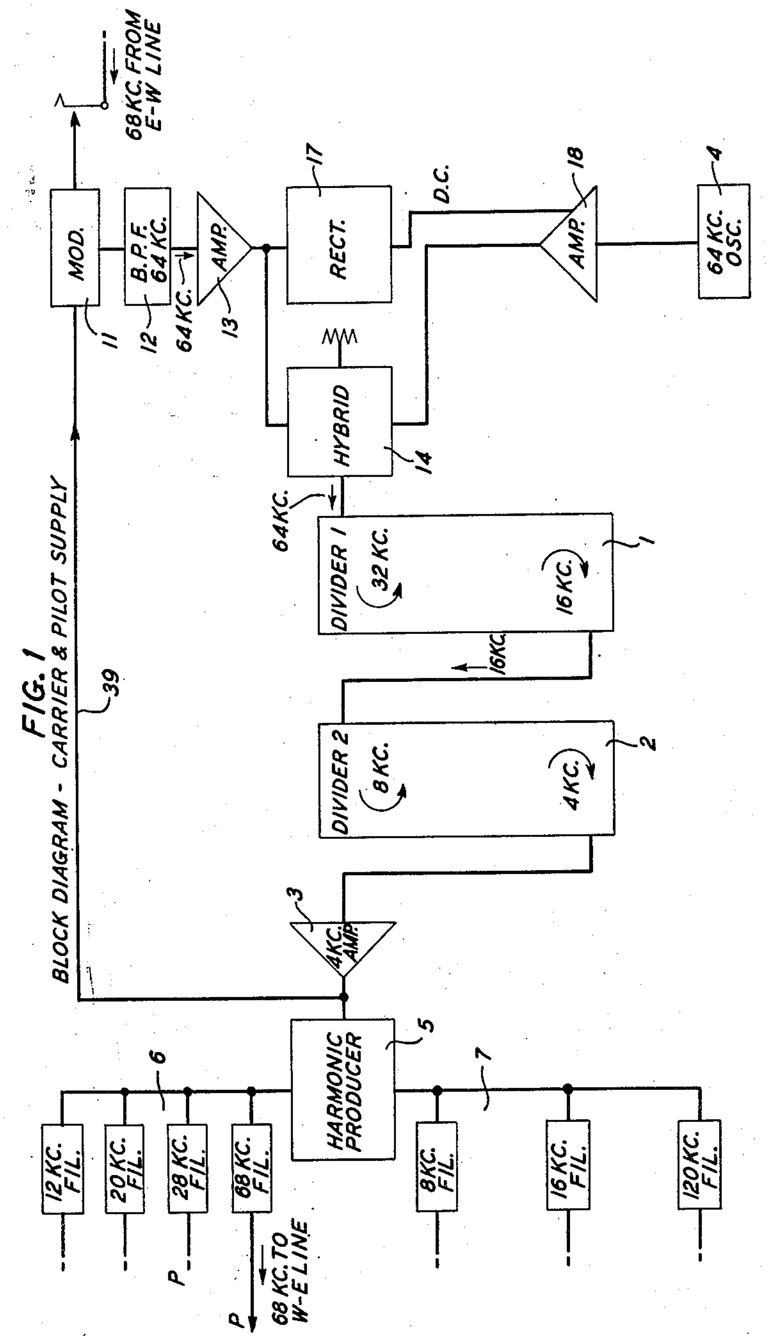
Fig. 1 is a block schematic of the supply circuits for pilot and carrier frequencies in a multiplex carrier system of the invention.

The base frequency is generated by a process of frequency subdivision in either one of two ways to insure greater reliability of operation and preclude pilot or carrier failures.

In the one method, the prime source is a 64 kilocycle local oscillator 4, which feeds into frequency subdividers 1, 2 to produce the base frequency of 4 kilocycles. Initially, the local oscillators 4 at both terminals are running freely.

The other method relies on the incoming pilot frequency of 68 kilocycles which is modulated in modulator 11 with 4 kilocycles output of the divider 2, to yield a sideband of 64 kilocycles which is passed through band-pass filter 12. The 64 kilocycle is amplified in amplifier 13, then applied to the hybrid resistor arrangement 14, before passing through dividers 1, 2 for frequency division to yield the 4 kilocycle base frequency.

The base frequency so obtained from either method is amplified by amplifier 3 and applied to a harmonic producer circuit 5, from which odd harmonics are picked off separately by means of appropriate filters 6 to 12 kc., 20 kc., 28 kc., and 68 kc. Even harmonics are obtained from a rectifier circuit forming part of the harmonic producer 5, and band filters 7 separate the even harmonic frequencies of 8 kc., 16 kc., etc. The 68 kc. is a pilot frequency, which is picked off by one of the filters 6 and transmitted to the remote station over the W—E line of the spiral-four cable 20 as indicated in Fig. 2.

Figure 2:
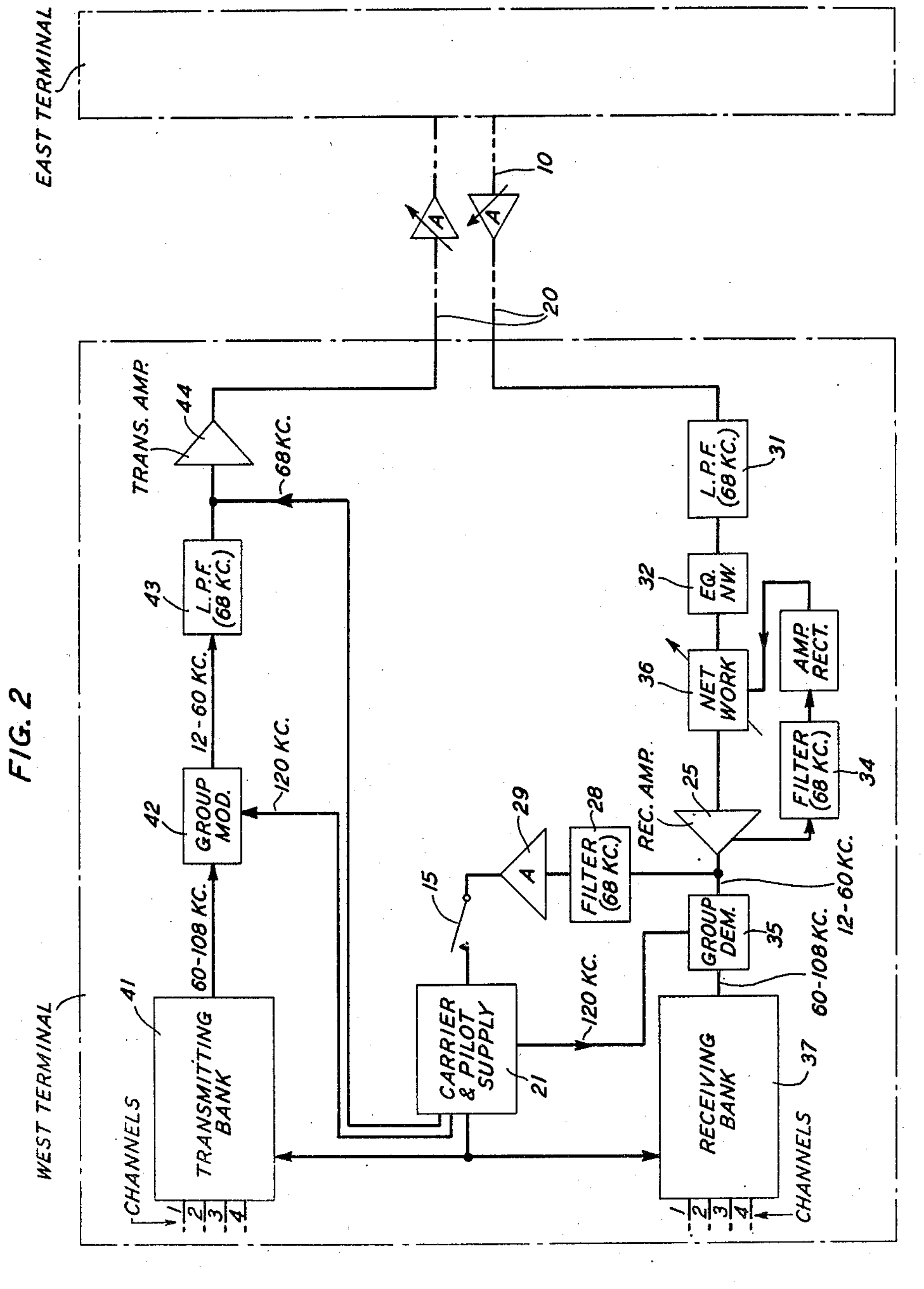
Fig. 2 is a block schematic of the multiplex carrier system, showing the terminals thereof.

The 68 kc. pilot frequency used in the local station for powering the dividers 1 and 2 (Fig. 1) originates likewise at a distant terminal E identical in layout to the W terminal shown in Figs. 1 and 2. It is transmitted from the remote E terminal over the E—W line of the spiral-four cable 20 and is picked off from the receiving amplifier 25 as shown in Fig. 2. When the switch 15 is in the closed position, the pilot comes in actively and takes over the energization of the local carrier supply circuits 21. A portion of the incoming pilot energy is rectified in rectifier 17 and the resulting direct current voltage is applied to an amplifier 18 in such manner as to block transmission of the 64 kc. power from oscillator 4 to the frequency divider. Under these circumstances, transmission from the local oscillator 4 is blocked but the remote oscillator in terminal E still remains active in producing the incoming pilot aforementioned.

When there is a failure of the incoming pilot frequency on the E—W line, the blocking voltage is removed from amplifier 18 and the local oscillator 4 takes over automatically, feeding 64 kc. power through amplifier 18 into the divider 1. The base frequency in this eventuality is derived from the power furnished by local oscillator 4. The frequency divider circuits 1, 2 or submultiple generators may be of the type disclosed in U. S. Patent 2,159,596 issued April 15, 1938 to R. L. Miller. Each divider reduces the incoming frequency $f$ by a factor of 4; thus, divder 1 converts the 64 kilocycles to 16 kilocycles, while divider 2 converts the 16 kilocycles to the base frequency of 4 kilocycles.

The base frequency 4 kilocycles is amplified and then utilized in the harmonic producer 5 for providing the various frequencies needed for the carrier system as follows:

| Channel modems: | Kilocycles |
|---|---|
| Channel 1 | 8 |
| Channel 2 | 12 |
| Channel 3 | 16 |
| Channel 4 | 20 |
| Group modem | 120 |
| Pilots: | |
| Line | 68 |
| Test | 28 |

The amplified base frequency is also applied along lead 39 to modulator 11 to be modulated with the 68 kilocycle pilot and yield the 64 kilocycle sideband which is passed through the submultiple generator or divider 1. This occurs when there is an incoming pilot and it is the primary source of energization for the harmonic producer 5.

The spiral-four cable 20 consists of four stranded conductors individually insulated with polyethylene and twisted together around a polyethylene core in spiral fashion. The cable is covered with a polyethylene jacket, over which is a layer of cotton tape impregnated with carbon black. The outer cover for the cable is a coating formed from a blend of polymers having embedded stainless steel armor wires.

In the two-way communication system shown in Fig. 2, the respective pilots going in opposite directions through the cable 20 are equal in frequency and thus maintain synchronism. If the pilots differed slightly in frequency, as might happen if they were generated independently, and if further there were substantial "cross-talk" at this frequency between the oppositely-directed lines, the gain of the pilot-regulated repeaters (shown diagrammatically) would be varied in accordance with this difference frequency, which would be detrimental to the transmission of special services such as telephoto and the like.

Fig. 2 shows schematically East and West terminals of the carrier system and illustrates the manner of picking off a pilot and applying it to energize the frequency dividers of the supply circuits.

The transmitting circuit of the W terminal involves a transmitting channel bank 41 of conventional design which provides channels in a range from 60–108 kc. A group modulator 42 shifts the channels into a band comprised between 12–60 kc. by modulation with a 120 kc. carrier. The low pass filter 43 passes the 12–60 kc. band to the transmitting amplifier 44, whence, it is propagated over the spiral-four cable 20 to the distant E terminal. The E and W terminals are alike, so that for brevity of description, only the W terminal has been described. The 68 kc. pilot from the W terminal, originating in the harmonic producer 5 and selected by one of the filters 6 (Fig. 1) is applied to the transmitting amplifier 44 and propagated over the spiral-four cable 20 together with the 12–60 kc. band of channels aforementioned.

In the receiving circuit of Fig. 2, the low pass filter 31 transmits 68 kilocycles and all frequencies below 68 kilocycles. The equalizer 32 represents a composite of networks for providing basic delay, bulge, slope and flat equalization in a well known manner.

Automatic regulation is provided at each amplifier 25 under the control of the 68 kilocycle pilot, which is picked off by the filter 34 to adjust the regulating network 36. The channels received are transmitted from the amplifier 25 to the receiving channel bank after demodulation in the group demodulator 35.

For the purpose of energizing the frequency dividers, a 68 kilocycle pilot frequency is taken off from the receiving amplifier 25 through a narrow filter 28, amplified by amplifier 29 and thence applied through the key 15 to modulator 11 as previously described in connection with Fig. 1. When the system has been set in operation, the key 15 at one terminal (as prearranged) is opened so that the 64 kilocycle oscillator at that terminal controls the entire system, the key 15 at the other terminal being closed.

Figure 3:
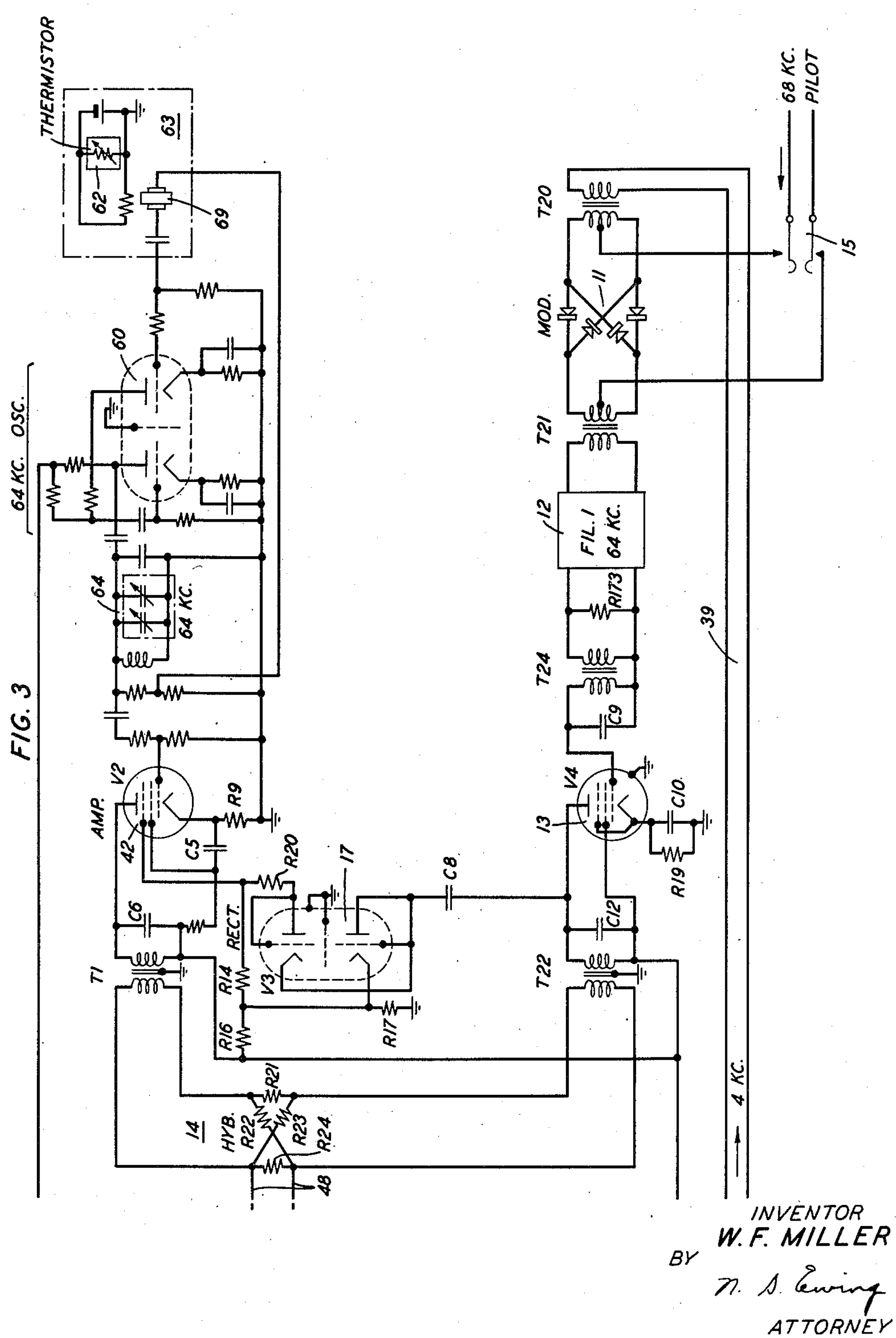
Figs. 3 and 4 are schematic circuit diagrams which when placed end to end show the detailed circuits corresponding to the block schematic of Fig. 1.
Figure 4:
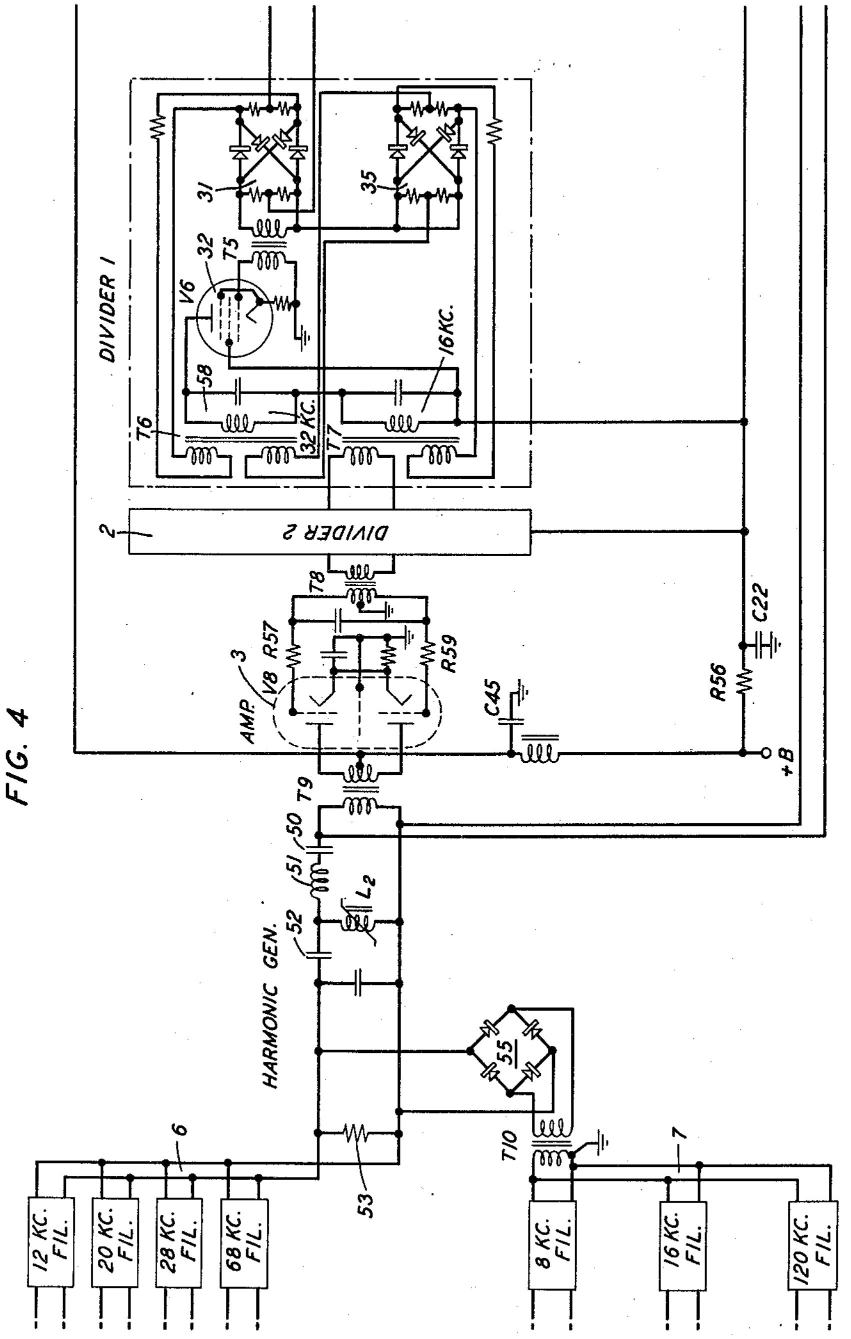

Figs. 3 and 4 show the detailed circuit schematics of the pilot and carrier frequency supplies illustrated in Fig. 1.

*Local oscillator*

Referring to Fig. 3, the local oscillator 60 is of the quartz crystal type. Crystal unit 69, tuned to 64 kilocycles is connected in the grid circuit of double-triode vacuum tube 60. The crystal frequency is stabilized against temperature variations by means of a thermistor 62 and internal heater 3 fed from a constant voltage supply. The resulting oscillator frequency stability is about ±4 cycles in 100 kilocycles.

The output of the oscillator 60 is tuned to 64 kilocycles by an L—C circuit 64 and applied to the grid of pentode tube $V_2$, which serves as an amplifier and switching tube.

*Switching circuit*

The tube $V_2$ acts as a switching device to control the transmission of 64 kilocycles from the crystal oscillator 60. When the key 15 is in the local position (open as shown in Fig. 3), there is a low positive voltage on the suppressor grid 42 of tube $V_2$, and the tube functions as a straight amplifier, whereby the 64 kilocycles from the local oscillator is applied through transformer $T_1$, and resistance hybrid R21, R22, R23, R24 to divider circuit 1 (see Fig. 4). The positive potential aforementioned on the suppressor grid 42 is derived from the B+ battery (Fig. 4) via resistances R56, R16, and R14.

When the key 15 is in the remote position (closed), the incoming 68 kilocycle pilot frequency from the receiving amplifier of the terminal is applied to copper oxide modulator network 11. The 68 kilocycle is modulated therein with 4 kilocycles obtained from the output of amplifier 3 (Fig. 4) over leads 39 and the resulting 64 kilocycles product is applied to the 64 kilocycle filter 12 through impedance matching transformer $T_{21}$.

The filter 12 passes the desired 64 kilocycle product and suppresses the unwanted modulation products. The 64 kilocycles is amplified by pentode tube 13 and thence applied to the first submultiple generator or divider 1 through transformer $T_{22}$ and resistance hybrid 14.

When the key 15 is thus in the remote position, the local oscillator 60 is in a blocked condition because of a negative blocking voltage placed on tube $V_2$ at its suppressor electrode 42 from the received pilot tone. This blocking voltage is established by the rectification of the 64 kilocycle voltage by rectifier and voltage doubler tube 17. The negative voltage so produced is applied to the suppressor grid 42 of tube $V_2$, thereby blocking the local oscillator output from being applied to the divider circuit. Under these circumstances, the 64 kilocycles is derived from the incoming pilot frequency rather than from the local oscillator.

The resistance hybrid 14 inserts a high loss between transformers $T_1$ and $T_{22}$, preventing the output of the local oscillator 60, when the key is in its local position, from being applied to transformer $T_{22}$, rectified by tube 17, and tending to cut off tube $V_2$.

*Frequency divider circuit*

The purpose of the frequency divider circuits (Fig. 4) is to derive the base frequency 4 kilocycles from a 64 kilocycle source by subharmonic generation. This is accomplished in two steps: divider 1 converts the 64 kilocycles to 16 kilocycles and divider 2 converts the 16 kilocycles to the 4 kilocycle base frequency.

Referring to Fig. 4, the 64 kilocycle output of either the local oscillator 60 or the pilot derived 64 kilocycles, is impressed upon divider 1 via leads 48. The 64 kilocycles is applied to the carrier leg of the first regenerative modulator 31, and a 32 kilocycle amplified product is selected by tuned transformer 58 which is resonant to the 32 kilocycles, and this component is fed back to modulator 31. By continued regeneration through tube 32, the 32 kilocycle modulation product is built up strongly, and thereby a frequency division by 2 is accomplished.

In a like manner, a second division by two is accomplished by modulator 35, the same amplifier tube 32 being used by a reflexed arrangement. Thus, the 32 kilocycle output of transformer $T_6$ is impressed on the carrier leg of modulator 35. A second output transformer $T_7$, tuned to 16 kilocycles in series with transformer $T_6$, feeds back 16 kilocycles to the input of modulator 35. The regenerated 16 kilocycles derived from the modulator is then applied to the second divider 2, which similarly reduces 16 kilocycles to the base frequency 4 kilocycles.

The base frequency output from divider 2 is applied to amplifier 3 through transformer $T_8$, resonated to 4 kilocycles by a condenser for improving the wave shape of the base frequency. The amplifier 3 is a double-triode connected in push-pull and is operated considerably overloaded to reduce variations in its output. Resistors R57 and R59 are grid current limiters.

*Harmonic producer*

The output of the 4 kilocycle amplifier 3 is applied to the harmonic producer saturation coil $L_2$ through capacitor 50 and inductor 51, which are series resonant to 4 kilocycles. Capacitor 52 is a storage capacitor which in conjunction with the saturable inductance coil $L_2$ constitutes an odd harmonic producer.

The output of the saturated coil $L_2$ works into a load composed of resistor 53 and copper oxide rectifier network 55, and a bank of odd harmonic filters 6 passing 12 kilocycles, 20 kilocycles and 28 kilocycles. The rectifier 55 forms even harmonics of 4 kilocycles by rectifying the pulses of the odd harmonic producer $L_2$.

The output of the rectifier 55 is connected through an impedance matching transformer $T_{10}$ to the input of a bank of even harmonic filters 7, i. e., 8 kilocycles, 16 kilocycles, and 120 kilocycle filters, respectively. Transformer $T_{10}$ is grounded in its secondary coil to isolate the grounded filter circuits 7 from the balanced output of the rectifier 54.

The use of the odd harmonic generator $L_2$ in the relation to the banks of filters 6 and 7 serves to relieve or relax filter requirements. The odd harmonics are generated by coil $L_2$ at substantially constant amplitude and the various filters 6 separate these odd harmonics more easily, as the coexistent even harmonics from the saturated coil are at least 30 decibels lower in amplitude. Thus, the discrimination requirements of the filters 6 are relaxed by about 30 decibels at frequencies 4 kilocycles from the wanted frequency.

Likewise, the even harmonics produced by rectifier 55 are more easily segregated by the bank of filters 7, since the odd harmonics are balanced out to better than 25 decibels at the output of rectifier 55.

It should be understood that the carrier system disclosed herein may include radio relay links in a composite system operating at radio frequencies in addition to the spiral-four cable sections without departing from the spirit of the invention.

What is claimed is:

1. A two-way carrier transmission system including a pair of terminal stations, each of said stations including means to selectively receive a pilot wave of a first frequency $f_p$ that is transmitted from the other terminal station, an oscillation generator of a frequency $f_o$ that differs from said first frequency $f_p$ by a low base frequency $f_b$ to which both $f_p$ and $f_o$ are harmonically related, a frequency subdivider adapted to derive waves of the base frequency $f_b$ from applied waves of frequency $f_o$, a connection from said oscillation generator to said frequency subdivider to apply waves of frequency $f_o$ thereto, a modulator connected to receive waves of said base frequency $f_b$ from said frequency subdivider and waves of said pilot frequency $f_p$ from said selective receiving means, connections to apply output waves of frequency $f_o$ from said modulator to said frequency subdivider, frequency multiplying means energized by the base frequency wave output of said frequency subdivider for generating a pilot wave of frequency $f_p$, means to transmit said generated pilot wave $f_p$ to said other terminal station, and means responsive to said selectively received pilot wave to maintain said oscillation generator effectively disconnected from said frequency subdivider so long as said pilot waves are being received.

2. A frequency supply for carrier systems comprising a local oscillator for generating a frequency $f_o$, a frequency subdivider connected thereto adapted to derive waves of a base frequency $f_b$ therefrom, means for receiving a pilot signal frequency $f_p$, means for converting the pilot signal frequency $f_p$ to the oscillator frequency $f_o$, and means for applying the converted frequency to said subdivider.

3. The frequency supply system of claim 2, wherein said converting means is a modulator supplied with the pilot frequency $f_p$ and the base frequency $f_b$ derived from said subdivider.

4. The system of claim 3, wherein the base frequency $f_b$ is an even submultiple of the local oscillator frequency $f_o$.

5. The system of claim 2, and means connected to the output of said subdivider for deriving harmonics of said base frequency $f_b$.

6. The system of claim 2, and means for switching the energization of said subdivider from said converted pilot signal to said local oscillator automatically upon the failure of said pilot signal.

7. The system of claim 6, wherein said means for switching comprises an amplifier supplied with the output of said local oscillator and means responsive to the received pilot signal for blocking the transmission through said amplifier of the output of said local oscillator.

8. The system of claim 7, wherein said means responsive to the received pilot signal comprises a rectifier for said pilot signal and connections for supplying the resulting direct current voltage to said amplifier to block transmission therethrough.

9. In combination, a source of oscillations of frequency $bf$ where $b$ is a prime number, a modulator for combining oscillations from said source with oscillations of frequency $f$, means for selecting from the output of said modulator combination products of one sideband $(bf \pm f)$, a subharmonic generator, connections for supplying to said subharmonic generator the selected output of said modulator, means selecting from the output of said subharmonic generator oscillations of frequency $f$, and connections for supplying said selected oscillations of frequency $f$ to said modulator as the oscillations to be combined with oscillations from said source.

No references cited.